(12) United States Patent
Jin et al.

(10) Patent No.: US 7,209,078 B2
(45) Date of Patent: Apr. 24, 2007

(54) ANTENNA ARRAY CALIBRATION

(75) Inventors: Hang Jin, Plano, TX (US); John Grabner, Plano, TX (US)

(73) Assignee: Navini Networks, Inc., Richardson, TX (US)

( * ) Notice: Subject to any disclaimer, the term of this patent is extended or adjusted under 35 U.S.C. 154(b) by 9 days.

(21) Appl. No.: 11/115,598

(22) Filed: Apr. 27, 2005

(65) Prior Publication Data

US 2006/0044185 A1    Mar. 2, 2006

Related U.S. Application Data

(60) Provisional application No. 60/606,534, filed on Aug. 31, 2004.

(51) Int. Cl.
*G01S 7/40* (2006.01)
*H01Q 3/22* (2006.01)
*H04B 17/00* (2006.01)

(52) U.S. Cl. .................... 342/368; 342/174; 455/67.11

(58) Field of Classification Search ................ 342/174, 342/368, 371–372, 374, 377, 383–384; 455/67.11, 455/115.1, 115.2, 115.3, 226.1, 226.2, 276.1
See application file for complete search history.

(56) References Cited

U.S. PATENT DOCUMENTS 6,339,399 B1 *  1/2002  Andersson et al. ......... 342/174
6,633,200 B2   10/2003  Kolanek ..................... 330/149
6,735,423 B1    5/2004  Uskali et al. ............ 455/249.1
2003/0054790 A1 *  3/2003  Sanada et al. .............. 455/334

* cited by examiner

*Primary Examiner*—Thomas H. Tarcza
*Assistant Examiner*—F H Mull
(74) *Attorney, Agent, or Firm*—Kirkpatrick & Lockhart Preston Gates Ellis LLP (57) ABSTRACT

A smart antenna calibration system is disclosed for calibrating an antenna array having a plurality of antennas. Each antenna has a calibration coupler for providing a monitoring signal indicative of a signal passing through a transceiver associated thereof, and a processing unit including at least one signal splitter that splits at least one monitoring signal and a combiner array comprising one or more combiners for combining at least two split monitoring signals from first and second antennas to produce a first combined signal representing an in-phase sum and a second combined signal representing a quadrature sum. A power detector is in communication with the processing unit, which is configured to estimate a power level of the signal passing each of the first and second antennas and the in-phase power and quadrature power of the in-phase and quadrature sums for determining a phase difference of the signal on the antennas.

22 Claims, 7 Drawing Sheets

ANTENNA ARRAY CALIBRATION

CROSS REFERENCE TO RELATED APPLICATION

This application is related to, and claims the benefits of U.S. Provisional Patent Application Ser. No. 60/606,534, which was filed on Aug. 31, 2004.

BACKGROUND

The present invention relates generally to wireless communications systems, and more particularly to the calibration of one or more smart antennas for wireless communications to ensure the performance and signal quality of wireless communications systems.

Smart antenna technology can significantly improve performance and economics of wireless communications systems. It can enable PCS, cellular, and wireless local loop operators to gain significant increases in signal quality, capacity, and coverage area. Operators often require different combinations of these advantages at different times. Systems that offer the most flexibility in terms of configuration and upgradeability are often the most cost-effective, long-term solutions.

Smart antennas, also known as adaptive antennas, have a distinct advantage in modern wireless communications systems. A smart antenna is capable of beam forming or directing a beam of radiated energy toward a desired receiver. The dual purpose of a system deploying one or more smart antennas in an antenna array is to augment the signal quality of the radio based system through a more focused transmission of radio signals without reducing signal capacity. One advantage of this capability is to direct more power to the desired receiver. Another advantage of using smart antenna arrays for beam forming is the ability to reduce the transmitted power due to the more directional nature of smart antennas. Finally, a system deploying smart antenna arrays typically improves the channel conditions, such as a signal-to-interference ratio of the received signal, between any smart antenna array and the desired transceiver.

In order to accurately form a desired beam, the amplitude and phase of each component of the adaptive array subsystem should be known with a reasonable degree of precision. Un-compensated differences in gain and phase in a system with smart antennas degrade the antennas' performance. Ideally, the gain and phase characteristics are predetermined at the time of manufacture and are environment-invariant. However, in reality these characteristics vary over time and different environments. Thus, a method and apparatus to calibrate the antenna array is needed. Specifically, a method to determine variations in gain and phase of a system having one or more smart antennas and a method to compensate for those variations are needed.

One conventional calibration method is the "remote subscriber/transponder assisted calibration". This approach requires the assistance from a remote subscriber/transponder unit with a predetermined location. A set of N orthogonal calibration signals needs to be generated and then transmitted from each antenna to allow the subscriber/transponder to calculate the phase and power of each signal from each antenna, where N is the number of the antennas in an antenna array. Furthermore, the subscriber/transponder shall be placed at a line of sight (LOS) location to the antenna array, otherwise the air channel effects due to multi-path may significantly degrade calibration accuracy.

Another conventional calibration method is the "on-site calibration with a collocated calibration unit". This approach requires a special collocated calibration unit and involves generating and injecting special calibration signals into the transmitter and receiver chains. The collocated calibration must have the ability to compute the phases and powers of multiple signals (calibration signals).

Both conventional approaches require a special calibration period during which special calibration signals are generated and injected or transmitted to the calibration unit. This causes a disruption to the normal system operation. Moreover, both approaches require a special calibration unit or subscriber unit/transponder that has the capability to detect simultaneously both the phase and power of multiple calibration signals. Both the said disruption and the need for special equipment can be prohibitively costly in certain wireless communications system designs.

Therefore, desirable in the art of smart antenna array designs are improved array calibration systems and methods that ensure the performance and signal quality of wireless communications systems.

SUMMARY

In view of the foregoing, the following provides a system and method ensuring the performance and signal quality of wireless communications systems with smart antenna arrays.

In one embodiment, a smart antenna calibration system is disclosed for calibrating an antenna array having a plurality of antennas. Each antenna has a calibration coupler for providing a monitoring signal indicative of a signal passing through a transceiver associated thereof, and a processing unit including at least one signal splitter that splits at least one of the monitoring signals and a combiner array comprising one or more combiners for combining at least two of the split monitoring signals from a first and a second antennas to produce a first combined signal representing an in-phase sum and a second combined signal representing a quadrature sum thereof. A power detector is in communication with the processing unit, which is configured to estimate a power level of the signal passing each of the first and second antennas and the in-phase power and quadrature power of the in-phase and quadrature sums for determining a phase difference of the signal on the two antennas. The power and phase differences can be used to calibrate one or more antennas in the antenna array.

The construction and method of operation of the invention, however, together with additional objects and advantages thereof will be best understood from the following description of specific embodiments when read in connection with the accompanying drawings.

DESCRIPTION

The following will provide a detailed description of improved array calibration systems and methods that ensure the performance and signal quality of wireless communications systems.

Figure 1:
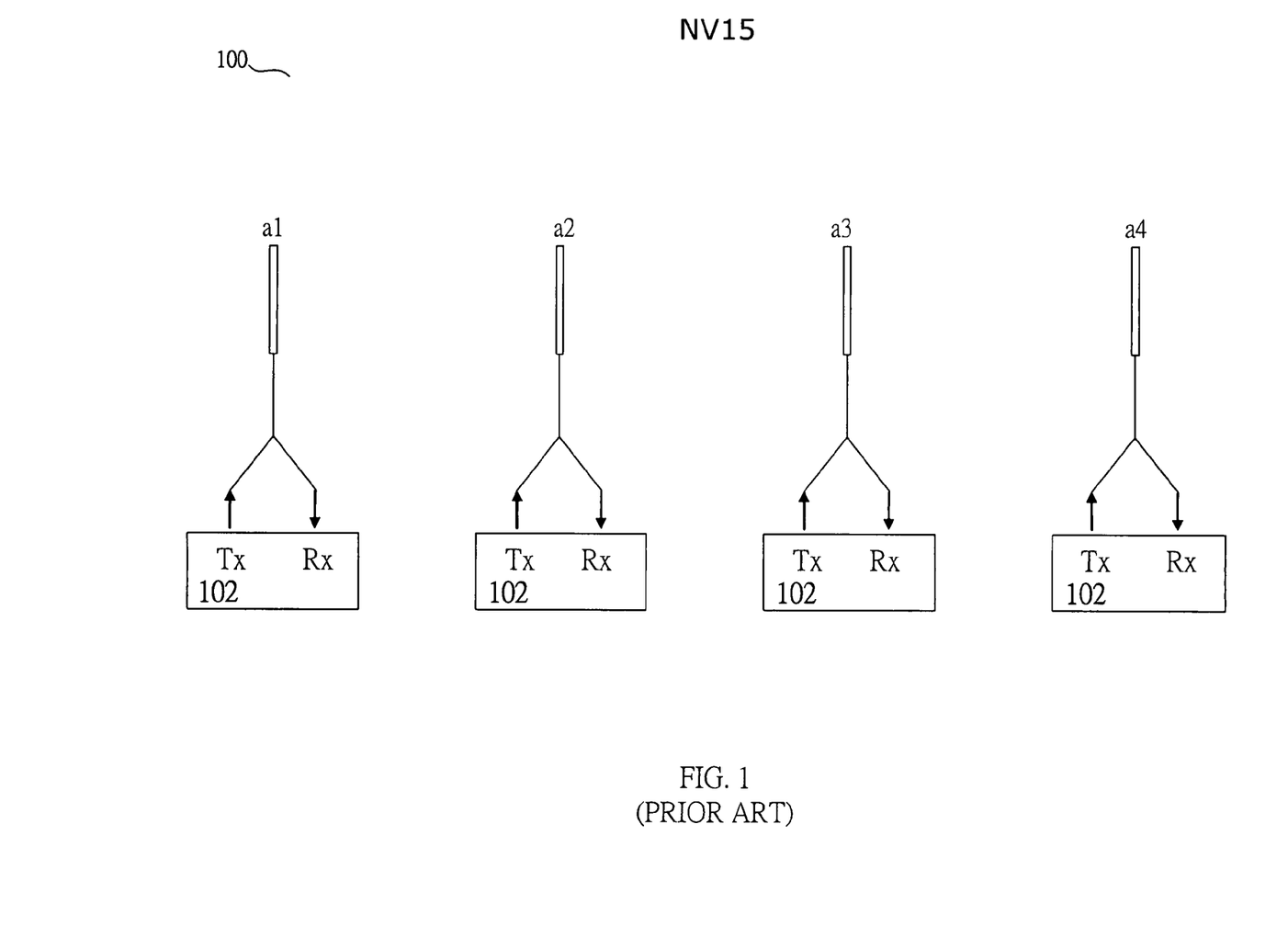
FIG. 1 presents a conventional antenna array.

FIG. 1 presents a conventional antenna array 100. For simplicity, an array having four antennas is presented. Each of the four antennas (labeled "a1", "a2", "a3" and "a4") receives a transmit (Tx) input from a transceiver 102 and releases a receive (Rx) output to the transceiver 102. The antenna gain and phase characteristics are determined at the time of manufacture. However, due to both time and environmental effects, the antenna gain and phase characteristics may change and the antennas may need to be tested. In addition, additional calibration may need to be performed in the field. Since the gain and phase of each antenna may vary significantly from the others, systems and methods need to be developed to economically perform the antenna test and calibration without disrupting normal communications traffic.

Figure 2:
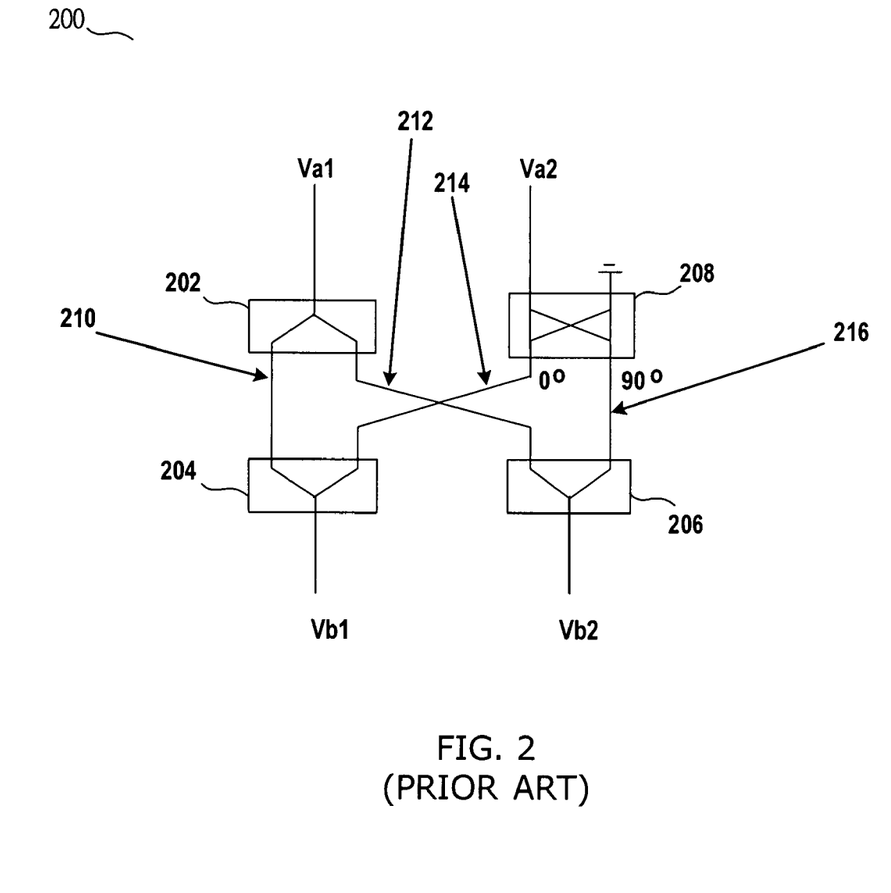
FIG. 2 presents a conventional quadrature combiner.

FIG. 2 presents a conventional quadrature combiner 200. Based on FIG. 2, it is understood by those skilled in the art that the conventional quadrature combiner 200 is a 2×2 device consisting of three 2:1 combiners/splitters 202, 204, and 206, and one 90-degree hybrid combiner/splitter 208. An input signal Va1 is split into two equal signals 210 and 212 that are in phase. Also, an input signal Va2 is split into two signals 214 and 216, both equal in power, but with the signal 214 in phase with the signals 210 and 212, and with the signal 216 in quadrature (90 degrees out of phase) with the signals 210, 212, and 214. An output signal Vb1 of the conventional quadrature combiner 200 is the in-phase sum of the signals 210 and 214, while an output signal Vb2 of the conventional quadrature combiner 200 is the quadrature sum, of the signals 212 and 216. In mathematical terms, the output signals Vb1 and Vb2 are represented as follows:

$$Vb1 = A*(Va1 + Va2)$$

$$Vb2 = A*[Va1 + Va2*\exp(j90°)]$$

where Va1, Va2, Vb1, and Vb2 are complex voltages containing both power and phase. A is a constant determined by predetermined hardware calibration.

It is noted that the detected powers Pb1 and Pb2 that are respectively associated with Vb1 and Vb2 are defined by the following power equations:

$$P_{b1} = A_I \cdot \{|V_{a2}|^2 + |V_{a1}|^2 + 2 \cdot |V_{a2}| \cdot |V_{a1}| \cdot \cos(\phi_{a2} - \phi_{a1})\}$$

$$P_{b2} = A_Q \cdot \{|V_{a2}|^2 + |V_{a1}|^2 + 2 \cdot |V_{a2}| \cdot |V_{a1}| \cdot \cos(90° + \phi_{a2} - \phi_{a1})\}$$

$$= A_Q \cdot \{|V_{a2}|^2 + |V_{a1}|^2 + 2 \cdot |V_{a2}| \cdot |V_{a1}| \cdot \sin(\phi_{a2} - \phi_{a1})\}$$

where $\phi a1$ and $\phi a2$ are the phases of Va1 and Va2. $A_1$, which is the in-phase gain, and $A_Q$, which is the quadrature gain, are constants that are determined by predetermined hardware calibration, and $|V_{a1}|$ and $|V_{a2}|$ are respective power levels for the input signals.

One aspect of this invention simplifies smart antenna calibration by using the power equations defined above to calculate the phase difference between two antennas ($\phi a1 - \phi a2$). The calculation is made simple when the input signal power to the quadrature combiner 200 $|V_{a1}|$ and $|V_{a2}|$ can be determined by simple derivation based on some predetermined calibration data and measurements of $P_{b1}$ and $P_{b2}$. Therefore, the power gain and phase for each antenna of the array can be compensated using the measured power and calculated phase values for each of the antennas. This is significantly different from conventional calibration methods in which signals at the carrier frequency have to be converted (e.g., demodulated by a demodulation module) to base band frequency for further processing, and both the power and phase detection have to be carried out separately. The present invention derives the phase difference through the power measurement and additional calculations based thereon, it is a "scalar detection" and avoids a complicated "vector detection".

Figure 3:
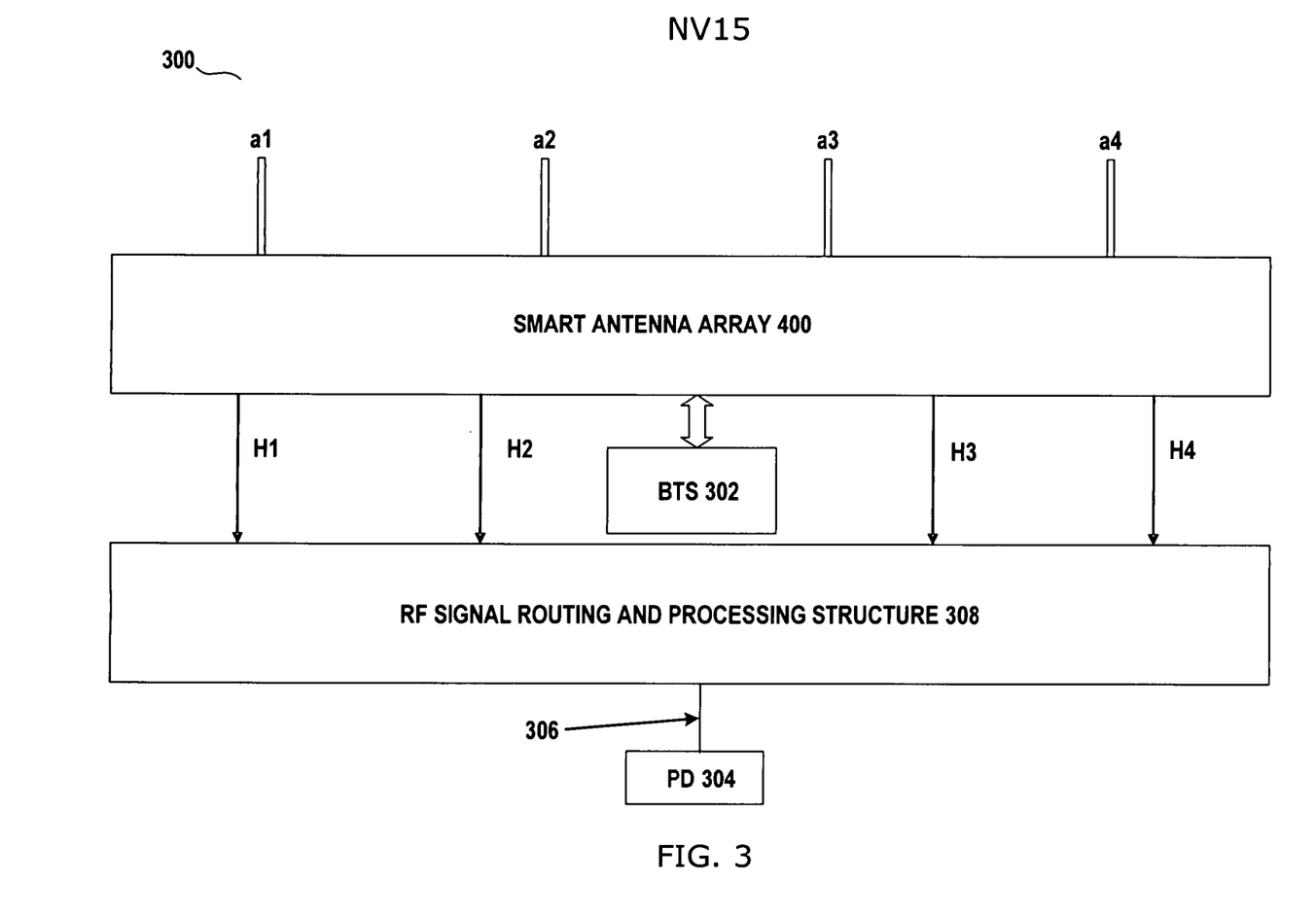
FIG. 3 presents a calibration system for a new smart antenna array in accordance with one embodiment of the present invention.

FIG. 3 presents a calibration system 300 for a new smart antenna array in accordance with one embodiment of the present invention. It includes a new smart antenna array 400 with new antenna signal couplers, a base transceiver station (BTS) 302, a power detector (PD) 304 connected, via a connection 306, to a RF signal routing and processing structure 308. It is understood that the connection 306 may be a wired or a wireless connection. The PD 304 can be a standard mobile terminal or any other custom design that has a power detection and output power control capability.

In this embodiment, although an array having four antennas is used for simplicity, it is understood that a different number of antennas may be included in the array without deviating from the spirit of this invention. The smart antenna array 400 is similar to the conventional antenna array 100 except that the smart antenna array 400 has a plurality of calibration couplers, to be further described in FIG. 4, added in series between each of the antennas (labeled "a1", "a2", "a3" and "a4"), and its associated transceiver. The calibration couplers allow the transmitted signal going to, or the receive signal coming from, each antenna to be monitored without interrupting the normal communications traffic. Monitoring signals H1, H2, H3, and H4 of the smart antenna array 400 are sent to the RF signal routing and processing structure 308, to be further monitored by the PD 304 via the connection 306 to derive the in-phase and quadrature combined powers for each antenna. This information is then sent to the BTS 302 for the calculation of the gain and phase values for each of the four antennas to be used for calibration of the smart antenna array 400.

The RF signal routing and processing structure 308 and the PD 304 utilize each of the monitoring signals H1, H2, H3, and H4 to estimate the downlink transmitted power and calculate the phase difference between the antennas by using the above-mentioned power equations. The estimated power and calculated phase values for each antenna is then sent to and used by the BTS 302 to calibrate each antenna for consistent power and phase results.

Figure 4:
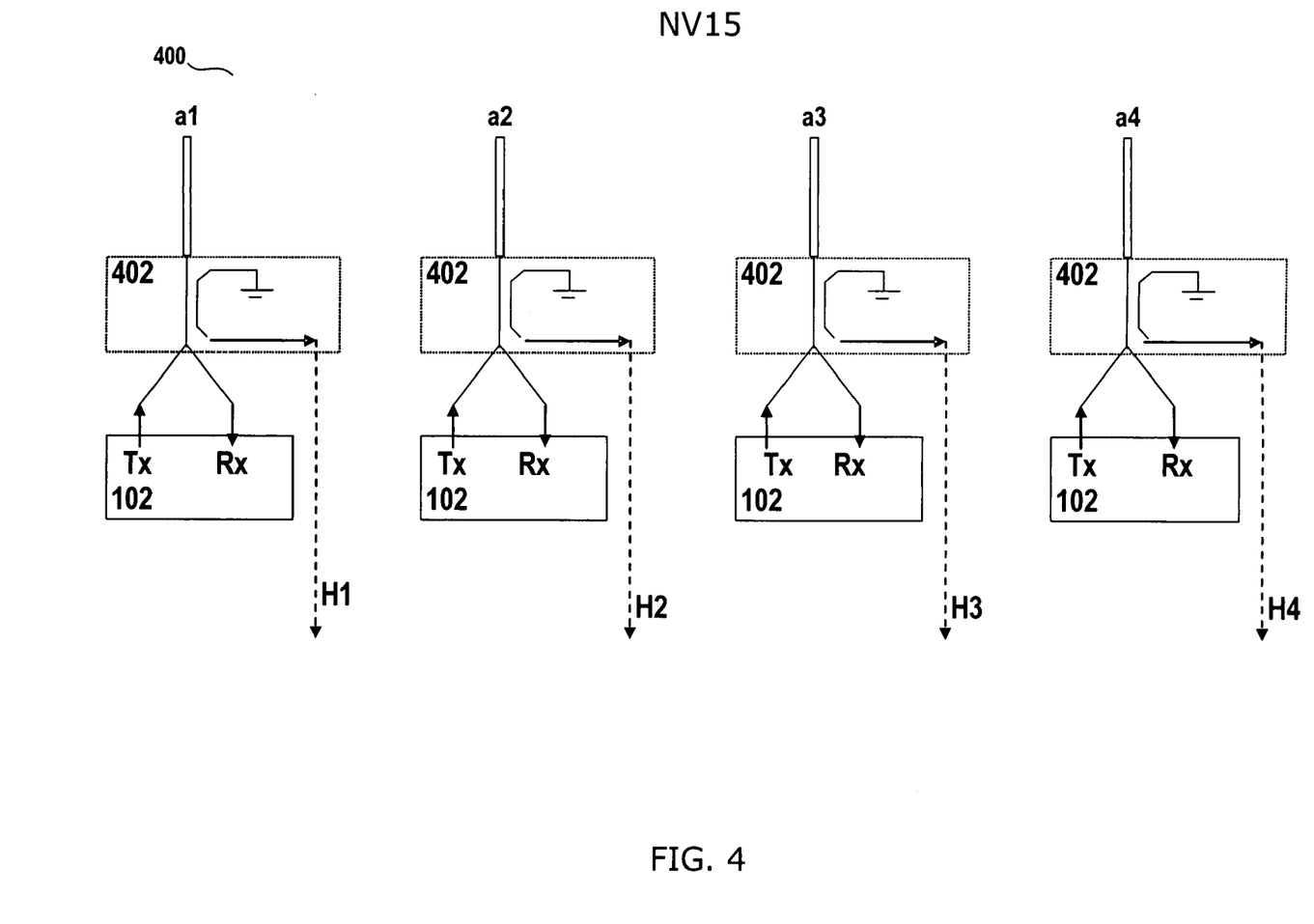
FIG. 4 presents a new smart antenna array with calibration couplers in accordance with one embodiment of the present invention.

FIG. 4 presents a new smart antenna array 400 with calibration couplers in accordance with one embodiment of the present invention. As shown, the new smart antenna array 400 is similar to the conventional antenna array 100, except that calibration couplers 402 are added between each of the antennas and its corresponding transceiver 102. The calibration couplers 402 allow a portion of the transmitted or received signals to be monitored without interrupting the normal communications traffic. In this manner, a known scaled version of the signals can be utilized for the measurement and calibration methodology used in this invention. The calibration couplers 402 should be placed physically as close as possible to each of the antennas (labeled "a1", "a2", "a3" and "a4"). The monitoring signals H1, H2, H3, and H4 are then routed to a RF signal routing and processing structure as previously shown in FIG. 3.

Figure 5:
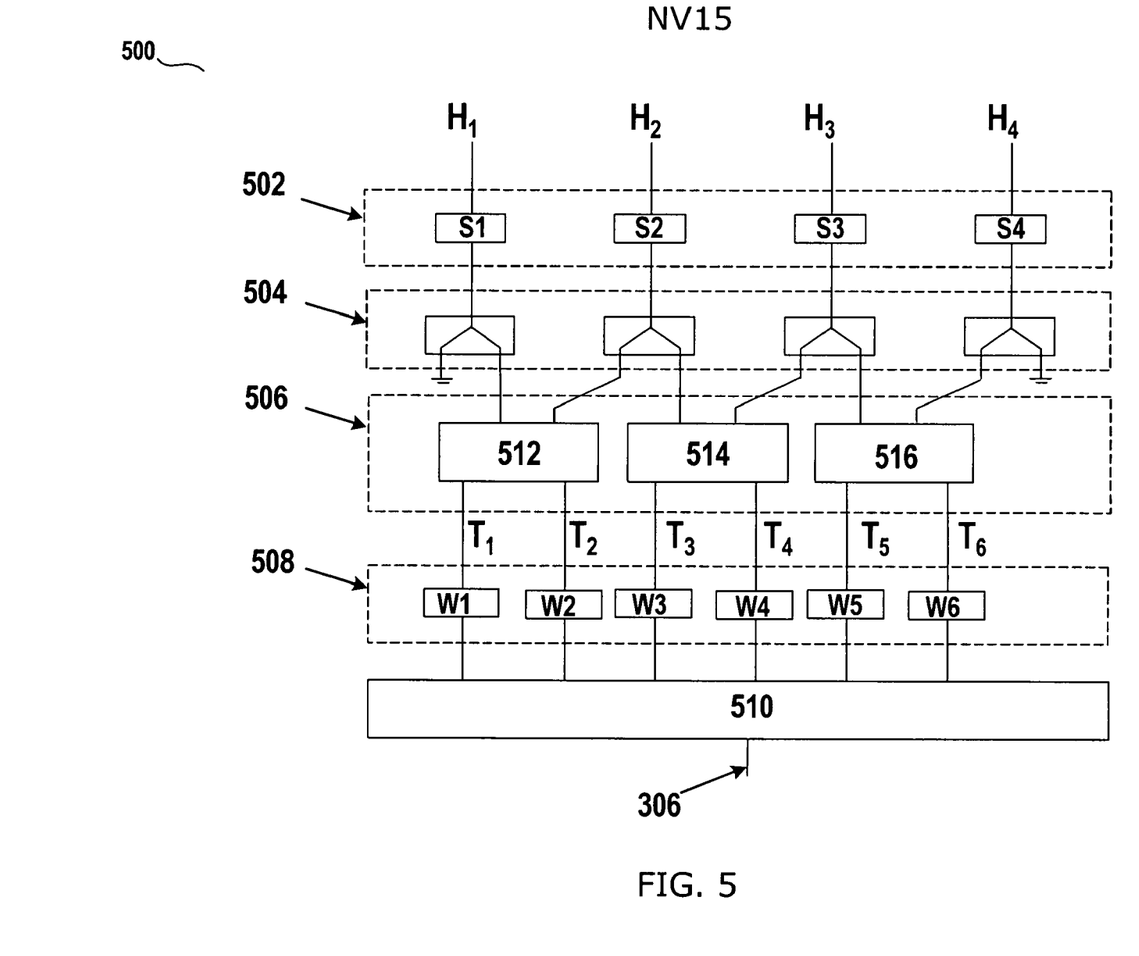
FIG. 5 presents a RF routing and processing structure in accordance with one embodiment of the present invention.

FIG. 5 presents a RF routing and processing structure 500 in accordance with one embodiment of the present invention. It is understood that the RF routing and processing structure 500 can be implemented into the calibration system 300 as the RF routing and processing structure 308 of FIG. 3. The RF routing and processing structure 500 includes a first switch array 502 having RF switches S1, S2, S3, and S4, a splitter array 504 having four 2:1 splitters, a combiner array 506 having three quadrature combiners 512, 514, and 516, a second switch array 508 having RF switches W1, W2, W3, W4, W5, and W6 for switching output power signals T1, T2, T3, T4, T5, and T6, and a 6:1 power combiner module 510. When implemented into the calibration system 300, the RF routing and processing structure 500 is connected to the PD 304, not shown, via the connection 306. The PD 304 (as shown in FIG. 3) can be a mobile receiver having a received signal strength indicator (RSSI) power detection capability used for transmitter calibration. The PD 304, not shown, may also need the capability to set its output power at a predetermined level if the antenna array receiver chain requires calibration at a predetermined level. The RF signal routing and processing structure 500 further receives from the smart antenna array 400 the monitoring signals H1, H2, H3, and H4. The key components in the RF routing/process structure 500 are the quadrature combiners 512, 514, and 516, where two signals are combined in phase and in quadrature (e.g., 90 degrees out of phase) simultaneously.

The RF routing and processing structure 500 routes and processes selected RF signals on the monitoring signals H1, H2, H3, and H4 through the first switch array 502, the splitter array 504 and the combiner array 506 to allow the PD. 304 to detect the in-phase/in-quadrature (I/Q) power levels. The detection of output powers and phase differences between antennas transmitter chains may be periodical or activated by commands from BTS 302. In the case of periodical calibration, the PD 304 detects the powers between antennas, and sends the information back to BTS 302 periodically based on a certain protocol. When PD 304 sends back the transmitter information back, it could go through normal communication protocol. Through the uplink signal that used by the PD 304 to send back the transmitter information, BTS 302 will obtain the array receiver chain calibration data.

The phase levels between the antennas can then be calculated from the combined I/Q power levels using the above-mentioned power equations. For example, the phase differences can be calculated as follows. When the input powers, such as $|V_{a1}|^2$ and $|V_{a2}|^2$, are known by measurement, the power equations will determine the phase difference between two antennas.

For example, a phase equation embodying the phase difference between antenna a1 and antenna a2 is as follows:

$$\phi_{a2} - \phi_{a1} = \pm a\cos\left\{\frac{P_{b1} - A_I \cdot (|V_{a2}|^2 + |V_{a1}|^2)}{2 \cdot A_I \cdot |V_{a2}| \cdot |V_{a1}|}\right\}$$

The ambiguity of the sign in the phase equation can be removed by using a checking equation, as shown as follows, for checking the sign of sin($\phi$a2-$\phi$a1) obtained from the second of the power equations:

$$\sin(\phi_{a2} - \phi_{a1}) = \frac{P_{b2} - A_Q \cdot (|V_{a2}|^2 + |V_{a1}|^2)}{2 \cdot A_Q \cdot |V_{a2}| \cdot |V_{a1}|}$$

If sin($\phi$a2-$\phi$a1) given by the checking equation is greater than zero, the plus sign is taken in the phase equation. Otherwise, the negative sign is taken.

With a similar procedure, the phase difference between antennas a2 and a3, and between antennas a3 and a4 can be calculated. Where $\Delta\phi_{a2\_1}$ is the phase difference between antennas a2 and a1, $\Delta\phi_{a3\_2}$ is the phase difference between antennas a3 and a2, and $\Delta\phi_{a4\_3}$ the phase difference between antennas a4 and a3. In this embodiment, if antenna a1 is to be used as a reference antenna, the phase difference between any other ones and a1 can be derived. For example, if the phase difference $\Delta\phi_{a2\_1}$ between a1 and a2 is known, and the phase difference $\Delta\phi_{a3\_2}$ between a2 and a3 is known, a simple mathematical summation should render the phase difference between a1 and a3.

Figure 6:
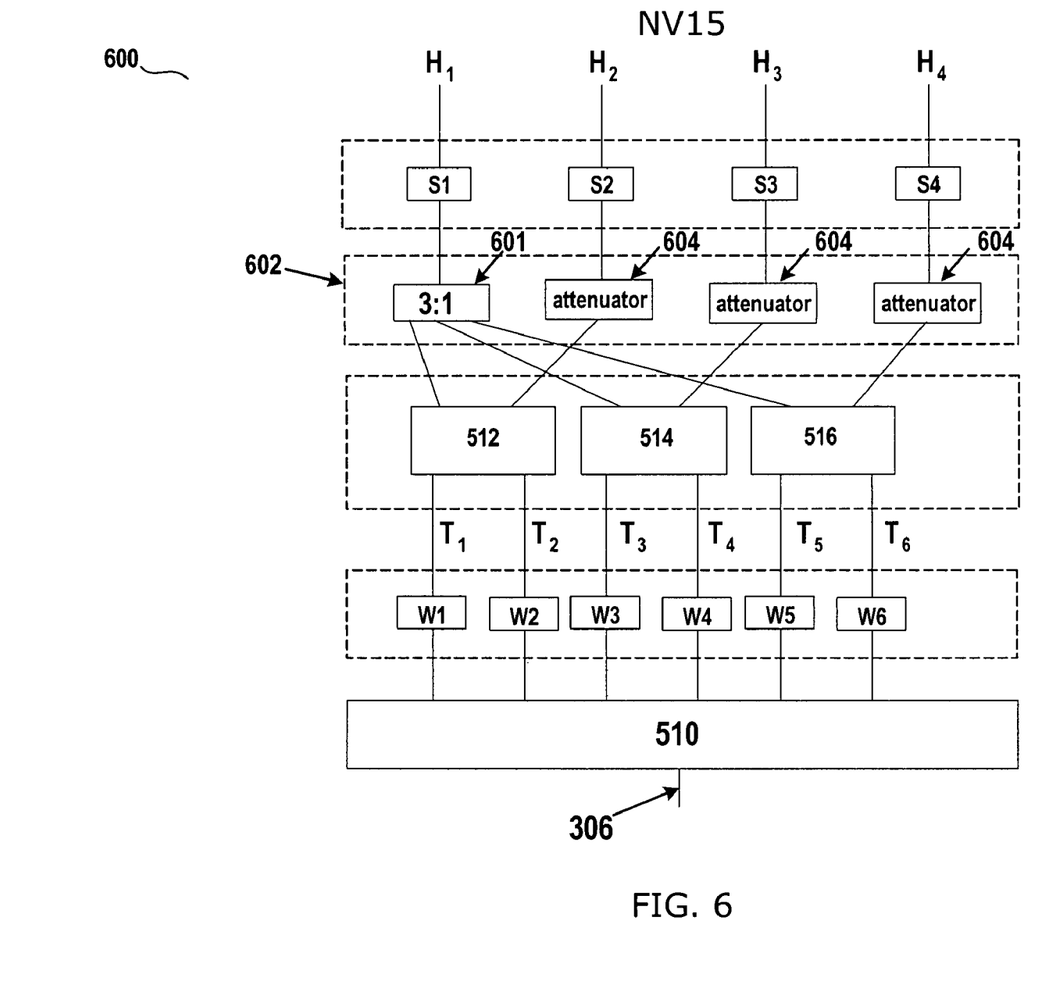
FIG. 6 presents another RF routing and processing structure in accordance with one embodiment of the present invention.

FIG. 6 presents another RF routing and processing structure 600 in accordance with one embodiment of the present invention. The RF routing and processing structure 600 is similar to the RF routing and processing structure 500, except for the interconnections of the quadrature combiner inputs. It is understood that the RF routing and processing structure 600 can be implemented into the calibration system 300 as the RF routing and processing structure 308 of FIG. 3. In the structure 600, each of the quadrature combiners 512, 514, and 516 receives their in-phase inputs from a 3:1 splitter 601 in a splitter array 602. Because the 3:1 splitter 601 splits the monitoring signal H1, which in turn comes from the antenna a1, the antenna a1 is thus utilized as the reference antenna, while all other antenna values are referenced to the antenna a1. Also, three attenuators 604 in the splitter array 602 also send one or more signals to the quadrature combiners 512, 514, and 516 to maintain consistent signal paths for all four paths (including both downlink and uplink calibration paths) to improve the calibration accuracy. It is understood that these attenuators 604 are optional, and that each of these attenuators 604 exhibits attenuation characteristics similar to that of the 3:1 splitter 601. As such, the attenuated signals can also be viewed as the split monitoring signals. The RF routing and processing structure 600, when implemented to the calibration system 300, is further understood to yield calibration performance characteristics and advantages similar to when the calibration system 300 is implemented with the RF routing and processing structure 500.

Figure 7A:
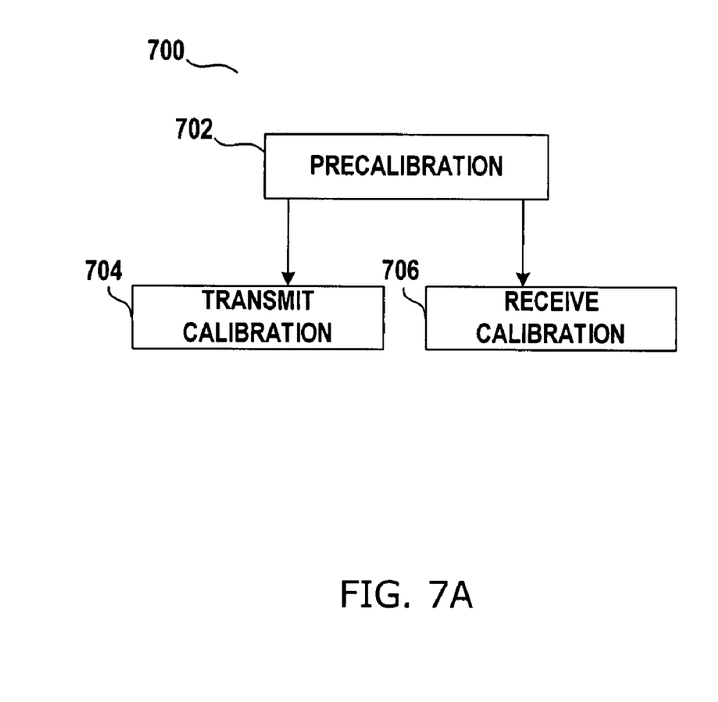
FIGS. 7A and 7B present flow charts summarizing the calibration method in accordance with one embodiment of the present invention.

FIG. 7A presents a process flow 700 for a calibration method to derive the necessary calibration data according to one embodiment of the present invention. The flow 700 begins at a step 702, where one or more smart antenna arrays are pre-calibrated to eliminate the hardware caused variations. This process can be done in the manufacture's factory or lab before the antenna array is deployed. Then the flow 700 proceeds to a step 704, where a transmit calibration process is performed to determine both the transmit path loss and phase results. Alternatively, the flow 700 can also proceed to a step 706, where a receive calibration process is performed to determine both the receive path loss and phase results. It is understood that the transmit path calibration and the receive path calibration are independent and they don't have to be performed together.

With reference to FIGS. 3, 4 and 7A, the step 702 is necessary to eliminate or compensate the undesired power and phase variations caused by the calibration hardware such as the calibration couplers 402 and the RF signal routing and processing structure 308. For the precalibration, first, one can inject a calibration signal with a known power and phase at H1 and detect the power and phase of the output at the output 306 without being interfered by other sources of signals from H2, H3, or H4 (e.g., by only turning on switch W1). This will determine the power and phase variations caused by the calibration hardware between H1 and W1.

Then, one could detect the power and phase of the output 306 with only one selected switch among W2, W3, and W4 turned on sequentially and by injecting the same calibration signal correspondingly at H2, H3 or H4. By detecting the power and phase of the output at the output 306 with the known switch W1, W2, W3, W4 on, the power and phase variations caused by the calibration hardware through these routes can be identified. Since the calibration signal fed into H1–H4 are known, the pre-calibration of the RF signal routing and processing structure 308 also generates the $A_I$, or the in-phase gain, and $A_Q$, or the quadrature gain, which are needed by the power equations and the phase equation to calculate the antenna phase difference. Collectively, the information obtained is referred to as the pre-calibration data, and will be provided to and stored in the BTS 302 for removing the power loss and phase variations caused by the calibration hardware from the final calibration data in the calibration process.

In the step 704, the transmit path calibration is conducted. The PD 304 monitors the down link power levels of the output power signals T1 through T6 and phase differences among different antennas from the same antenna array. The calibration includes two parts, the power detection and the phase difference detection parts. For the power detection, the PD 304 monitors a non-traffic channel such as a pilot channel, paging channel, access channel, or any other physical channel that maintains a constant power over time. The output powers of the antennas are estimated based on measurements of the power levels detected by the power detector (which will be described below). Once the antenna output powers P1, P2, P3, and P4 corresponding to the antennas a1, a2, a3, and a4 are known, the phase difference estimate can be executed. After both the corresponding in-phase and quadrature powers ($P_I$ and $P_Q$) are measured, the phase differences between the antennas can be mathematically determined.

Figure 7B:
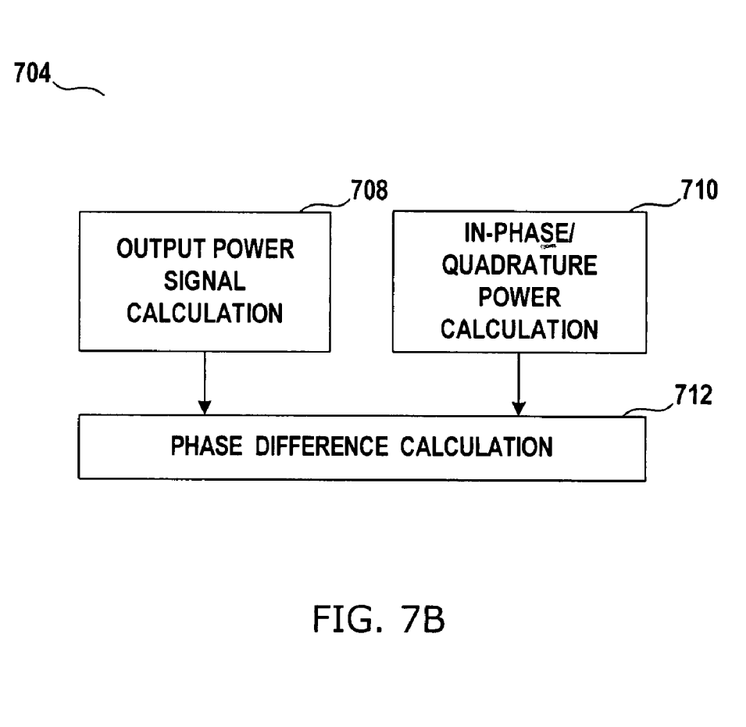

In FIG. 7B, the step 704 is further broken down into three steps: a step 708 for obtaining antenna output power values, a step 710 for obtaining the in-phase and quadrature power values, and a step 712 for obtaining the phase difference using the power values calculated in the steps 708 and 710.

It is now assumed that either the structure 500 or the structure 600 is implemented into the calibration system 300. With reference to FIGS. 3 to 7B, and in the step 708, the output power measurement of the antenna a1 is initialized by turning on the switches S1 and W1. In this case, only the antenna a1 is being analyzed. The PD 304 detects the monitored output power signal T1 after it passes through the power combiner module 510. The output power of the antenna a1 is then calculated from the equation:

$$P_1 = C_1 * P_{T1}$$

where $P_1$ is the transmit output power of the antenna a1, $P_{T1}$ is the output power signal T1 monitored by the PD 304 and $C_1$ is a constant. $C_1$ represents the influence of the calibration system including the calibration coupler 402 associated to the antenna a1 and the RF signal routing and processing structure 308 which may comprise factors such as the coupling coefficient (loss) of the calibration coupler 402 corresponding to the antenna a1, the loss between the monitoring signal H1 and the output power signal T1, the loss of the combiner module 510, the power ratio between the signal power on the monitored channel that is used for power detection by the PD 304 and the total transmitted power of the antenna a1. It is understood that these factors can all be determined in the pre-calibration process mentioned above or are known to the calibration system. For example, the coupling coefficient (loss) of the calibration coupler 402 corresponding to the antenna a1, the loss between the monitoring signal H1 and the output power signal T1, and the loss of the combiner module 510 can be obtained in the pre-calibration step 702, while the power ratio is pre-set and known to the calibration system. For example, if the coupling coefficient is 20 dB, the loss between H1 and T1 is 32 dB, the loss of the 6:1 combiner module 510 is 8 dB, and the power ratio of the transmitted power to the monitored power is 20%, then the constant $C_1$ will be equal to:

$$C_1 = 20 + 32 + 8 + 10 * \log 10(1/0.2)(dB).$$

The power detection and calculation processes for the antennas a2, a3 and a4 are similar. The antenna a2 output power is derived by first turning on switches S2 and W3 only, after detecting the monitored output power signal T3 by the PD 304, and the antenna a2 output power can be calculated. Similarly, the antenna a3 output power is derived by first turning on switches S3 and W5 only. After detecting the monitored output power signal T5 by the PD 304, the antenna a3 output power can be calculated. The similar process will apply to calculate the output power of the antenna a4. After first turning on switches S4 and W5 only, the monitored output power signal T5 is detected by the PD 304, and the antenna a4 output power is calculated.

The step 712 for the phase difference determination depends on step 710 which is performed to determine the combined in-phase and quadrature signals from each pair of antennas. For example, in order to analyze the in-phase and quadrature signals from antennas a1 and a2, the switches S1, S2, and W1 are turned on. Now, T1 represents the combined signal. The PD 304 first detects the monitored in-phase power ($P_I$) of the combined signal through the power combiner module 510. While switches S1 and S2 remain on, the switch W1 is turned off and the switch W2 is turned on. The PD 304 then detects the monitored quadrature power ($P_Q$) of the combined signal. The phase difference between the antennas a2 and a1 can then be calculated by utilizing the following equations, which are just another representation of the power equations:

$$P_I = A_I \cdot \{P_1 + P_2 + 2 \cdot \sqrt{P_1} \cdot \sqrt{P_2} \cdot \cos(\phi_2 - \phi_1)\}$$

$$P_Q = A_Q \cdot \{P_1 + P_2 + 2 \cdot \sqrt{P_1} \cdot \sqrt{P_2} \cdot \sin(\phi_2 - \phi_1)\}$$

where $P_I$ is the in-phase and $P_Q$ is the quadrature power of the combined signal, which have just been measured, $P_1$ and $P_2$ are the antenna a1 and antenna a2 output powers calculated previously in step 708, and $A_I$ and $A_Q$ are constants that are determined in the pre-calibration, which depend upon the coupling coefficients of the calibration couplers, the losses between H1 to T1 and H2 to T2, and the loss of the combiner module 510. Since the only unknown in these two equations is the phase difference, and there are two equations available for determination, the phase difference between a1 and a2 can then be obtained by solving any of these two equations.

The phase difference between the antennas a3 and a2, as well as between the antennas a4 and a3 can then be calculated by utilizing the same process. For example, the phase difference between the antennas a3 and a2 can be derived by first turning on switches S2, S3 and W3, when the PD 304 detects the in-phase power ($P_I$) of the output power signal T3. While switches S2 and S3 are kept on, the switch W3 is turned off and the switch W4 is turned on. The PD 304 then detects the monitored quadrature power ($P_Q$) of the output power signal T4. The phase difference between the antennas a3 and a2 can then be calculated.

Similarly, the phase difference between the antennas a4 and a3 can be derived by first turning on switches S3, S4 and W5, when the PD 304 detects the in-phase power ($P_I$) of the output power signal T5. While the switches S3 and S4 are kept on, the switch W5 is turned off and the switch W6 is turned on. The PD 304 then detects the monitored quadrature power ($P_Q$) of the output power signal T6. The phase difference between the antennas a4 and a3 can then be calculated.

It is preferred that the power detection of any two antennas be performed followed by the phase difference derivation of the same two antennas. For example, the powers of the antennas a1 and a2 could be detected first, and then the phase difference between antennas a1 and a2 could be derived. After that, the derivation of the antennas a3 and a2 power and phase difference is carried out. However, it is understood that it is possible to perform the power detection of all antennas followed by the phase difference derivation of each antenna pair. It is also understood that usually the BTS transmits the same signals through different antennas in the antenna array, but if these signals has power or phase variation to start with, the information should be passed on the calibration system so that these factors are considered and removed from the calibration process.

In the step 706, the receive path calibration is conducted. It is basically the same as the transmit path calibration except that it examines the calibration information for the receive path. The step 706 can also be divided in to steps 708, 710, and 712. For example, the process can be initiated by sending a calibration signal to the antenna array 400. An in-phase calibration signal can be sent to all the antennas simultaneously. The calibration signal can be sent by the PD 304 or some other signal source and could be a normal traffic signal, access signal, or other uplink signal. When the smart antenna array 400 receives the signal, the calibration couplers 402 will generate the monitoring signal H1, H2, H3, and H4, which are representative copies of the original calibration signals. Each of these signals will represent the antenna power and phase characteristics. Like the transmit path calibration, the BTS 302 will calculate the phase difference based on power measurements.

The power received by the receiver chains is a function of the PD 304 transmitted signal power and the transmission loss between the PD 304 output and the antenna input. For example, the level of the power received by the antenna a1 receiver ($P_{R1}$) is calculated by the equation:

$$P_{R1} = C_1 * P_{ST}$$

where $P_{ST}$ is the PD 304 output power, and $C_1$ is a constant representing the losses between the PD output port and the input port of the antenna a1.

If it is required that each of the antenna array receiver chains be calibrated at a predetermined input signal level, the PD 304 or any other device that transmitting the signal must have the capability to set its output power at a pre-determined level. A power module with the capability to map its output power with an internal parameter, such as an automatic gain control (AGC), can be utilized. With this mapping capability, the power module can set the internal parameter through the AGC to an appropriate value to generate the desired output power from the PD 304.

Further, the calibration can be activated on an as-needed basis or programmed to happen periodically. Both the BTS and the PD can initiate the process as long as both have communicated to cooperate in the calibration process. For example, the PD 304 listens to a non-traffic channel such as a paging channel or the access channel or any channels that are used for paging/broadcast purpose for monitoring a calibration activation signal disseminated by the BTS 302. Once the calibration activation information is detected, the PD 304 will start the power and phase difference detection. It is further understood that there are data processing required for this invention, but the processing can be performed on the antenna side as well as the PD side. For example, the RF signal routing and processing structure 308 can be attached to the smart antenna, but can also be in communication with the antenna but not physically attached thereto. Similarly, the mathematical calculations can be performed in the PD or in the BTS depending on the resource allocation.

This invention has distinct advantages over conventional smart antenna array calibration methodologies. For example, since no dedicated calibration periods are required, the normal communications traffic will not be interrupted. Since no dedicated down link calibration signals are required, individual downlink signals for each antenna to track the phase differences of each antenna may be eliminated. Finally, since no dedicated calibration module is required, a power detector such as a standard mobile terminal with power detection capability and the capability to set output power at a predetermined level can be used, the total calibration equipment cost is reduced.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A smart antenna calibration system comprising:
    an antenna array having a plurality of antennas, each antenna having a calibration coupler for providing a monitoring signal indicative of a signal passing through a transceiver associated thereof; and
    a processing unit including at least one signal splitter that splits at least one of the monitoring signals and a combiner array comprising one or more combiners for combining at least two of the split monitoring signals from a first and a second antennas to produce a first combined signal representing an in-phase sum and a second combined signal representing a quadrature sum thereof; and a power detector in communication with the processing unit, wherein the power detector and the processing unit are configured to detect a power of the signal passing each of the first and second antennas and the in-phase power and quadrature power from the first and second combined signals for determining a phase difference of the monitoring signals between the two antennas.

2. The calibration system as in claim 1, further comprising abase transceiver station coupled to the antenna array for data calculating and data storage.

3. The calibration system as in claim 1, wherein the processing unit further comprises a first switch array having one or more signal switches for selecting one or more of the monitoring signals.

4. The calibration system as in claim 3, wherein the processing unit further comprises a second switch array coupled to the combiner array for selecting one or more of the combined signals.

5. The calibration system as in claim 1, wherein the combiners are quadrature combiners.

6. The calibration system as in claim 1, wherein the signal splitter provides the split monitoring signals to more than two combiners and further comprises an attenuator for sending an attenuated signal of the monitoring signal to a predetermined combiner, the attenuated signal having an attenuation equal to an attenuation of the signal splitter.

7. The calibration system as in claim 1, wherein the power detector is a mobile receiver having a receive signal strength indicator (RSSI) power detection capability.

8. A method for calibrating a smart antenna array having a plurality of antennas, the method comprising:

providing a monitoring signal based an a signal passing through each antenna;

splitting each monitoring signal into one or more split monitoring signals;

estimating a power level of the signal passing through each antenna from the split monitoring signal associated therewith;

combining the split monitoring signals from every two of the antennas for generating two combined signals, a first combined signal representing an in-phase sum and a second combined signal representing a quadrature sum thereof;

estimating power levels of the first and second combined signals for every two of the antennas;

detecting phase differences among the antennas based on the estimated power levels of the signal passing through each antenna and the estimated power levels of the combined signals; and calibrating the smart antenna array based on the detected phase differences and estimated power levels of the signal passing the antennas.

9. The method as in claim 8, wherein the monitoring comprises monitoring the split monitoring signals and the combined signals.

10. The method as in claim 8, further comprising conducting a pre-calibration determining loss caused by hardware involved for detecting the phase differences.

11. The method as in claim 8, wherein the monitoring signals are generated from the signal received through a receive path of the smart antenna.

12. The method as in claim 8, wherein the monitoring signals are generated from the signal transmitted through a transmit path of the smart antenna.

13. The method as in claim 8, wherein the splitting uses an attenuator for generating the split monitoring signal.

14. The method as in claim 13, wherein the splitting further includes using the split monitoring signals associated with one predetermined antenna as a reference to be combined with the split monitoring signal from each other antenna.

15. A method for calibrating a smart antenna array having a plurality of antennas, the method comprising:

performing a pre-calibration to obtain pre-calibration data associated with calibration hardware;

performing either transmit path calibration or a receive path calibration, or both, wherein a monitoring signal for each antenna is generated based on a signal passing therethrough, from which a power level of the signal passing through each antenna is estimated and a phase difference between any two antennas is determined from the power levels of the signal passing through the two antennas and an in-phase sum and a quadrature sum of two split monitoring signals generated from the monitoring signals.

16. The method of claim 15 wherein the performing the transmit path calibration further includes:

transmitting the signal from the antennas;

estimating a power level of the signal passing through each antenna from the split monitoring signal associated therewith by factoring in the pre-calibration data;

combining the split monitoring signals from every two of the antennas for generating two combined signal; a first combined signal representing an in-phase sum and a second combined signal representing a quadrature sum thereof;

estimating power levels of the first and second combined signals fur every two of the antennas; and detecting phase differences among the antennas based on the estimated power level of the transmitted signal through each antenna and the estimated power levels of the combined signals.

17. The method of claim 16 further includes calibrating the smart antenna array based on the detected phase differences and estimated power levels of the transmitted signal through the antennas.

18. The method as in claim 16, wherein the monitoring comprises monitoring the split monitoring signals and the combined signals.

19. The method as in claim 16, wherein the performing a pre-calibration determines loss caused by hardware involved for detecting the phase differences.

20. The method as in claim 15, wherein the performing a receive path calibration further includes:

receiving the signal from a power detector;

estimating a power level of the signal passing through each antenna from the split monitoring signal associated therewith by factoring in the pre-calibration data;

combining the spilt monitoring signals from every two of the antennas for generating two combined signals, a first combined signal representing an in-phase sum and a second combined signal representing a quadrature sum thereof;

estimating power levels of to first and second combined signals for every two of the antennas; and detecting phase differences among the antennas based on the estimated power level of the received signal through each antenna and the estimated power levels of the combined signals.

21. The method as in claim 15, wherein one predetermined antenna is identified as a reference to be compared with other antenna for power and phase differences.

22. The method as in claim 21, wherein an attenuator is used for generating the split monitoring signal for the other antenna.

* * * * *

UNITED STATES PATENT AND TRADEMARK OFFICE
CERTIFICATE OF CORRECTION

| | | |
|---|---|---|
| PATENT NO. | : 7,209,078 B2 | Page 1 of 1 |
| APPLICATION NO. | : 11/115598 | |
| DATED | : April 24, 2007 | |
| INVENTOR(S) | : Hang Jin and John Grabner | |

It is certified that error appears in the above-identified patent and that said Letters Patent is hereby corrected as shown below:

In Column 12, line 34 of the subject patent, correct claim 16 to read:

"the antennas for generating two combined signals; a first"

Signed and Sealed this

Twenty-fourth Day of July, 2007

JON W. DUDAS
*Director of the United States Patent and Trademark Office*